Oct. 18, 1955   H. BERG   2,721,282
COMPENSATING WINDING
Filed June 22, 1954
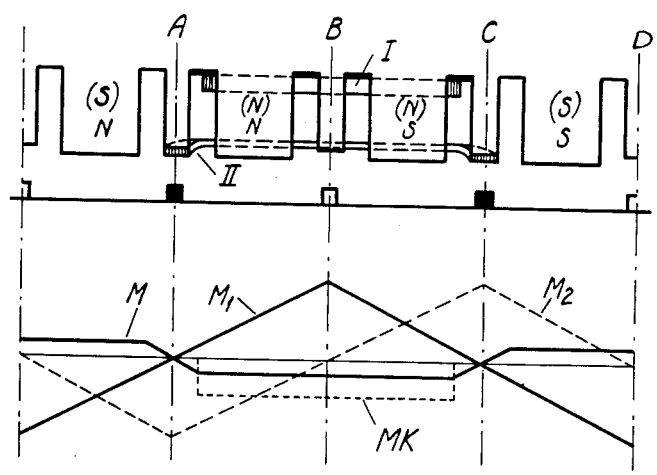
Inventor
Helge Berg
By Camerlinen
Attorney.

United States Patent Office 2,721,282
Patented Oct. 18, 1955

2,721,282

COMPENSATING WINDING

Helge Berg, Vasteras, Sweden, assignor to Allmänna Svenska Elektriska Aktiebolaget, Vasteras, Sweden, a corporation of Sweden Application June 22, 1954, Serial No. 438,514

Claims priority, application Sweden June 25, 1953

3 Claims. (Cl. 310—224)

In electric machines having more geometric poles than magnetic ones, i. e. having circuits independent of each other, the armature magneto-motive force originating from the one circuit disturbs the commutation within the other circuit. The purpose of the present invention is to compensate the cross magnetization within the commutating poles belonging to the one circuit, which cross magnetization is caused by the ampere turns per unit of length within the rotor originating from the other circuit. The machines in question of the so-called metadyne type often have a compensating winding embracing two main poles, and which counteracts the armature reaction produced by the current in its own current circuit, or may have to be provided with a particularly strong commutating winding. The feature of the invention is a compensating winding, which is extended over two pole pitches and which is arranged either in the commutation air gap or in slots within the commutation poles so that the planes of symmetry of the axial coil sides of the said compensating windings coincide with the planes of symmetry of the commutation poles. The advantage of the new arrangement resides in that the disturbing armature magneto-motive force coming from the other system is suppressed more or less within the commutation zone and that the auxiliary compensating winding may also replace a part of the said normal compensating winding with respect to the armature reaction below the main poles and below the commutation poles belonging to the circuit in question, or may also replace the above-mentioned compensating winding.

The invention will now be described, reference being made to the accompanying drawing showing a four-poles metadyne machine in plain development. The polarity of the two circuits is indicated by N and S, and the polarity belonging to the one system is indicated in parentheses. As shown in the drawing the machine is provided with a normal compensating winding I, which, however, is not a prerequisite for the invention, in that the commutation winding (not shown) on the pole B can instead be made so strong that it neutralizes, within the commutation zone of the pole B, the M. M. F. $M_1$ of the armature. The compensating winding II according to the invention is extended over two pole pitches and is located within the air gap under the commutation poles A and C. It may also be arranged within slots in the poles. In the M. M. F.-diagram the cross magnetization coming from the one circuit is indicated by $M_1$ and that coming from the other circuit by $M_2$. The M. M. F. produced by the compensating winding I is designated by $M_K$. Within the commutation zone below the commutation poles A and C, the disturbing M. M. F. $M_1$ is suppressed by an opposed M. M. F. M produced in the winding II. If, for example, the section B—C—D according to the drawing is considered, within the commutation zone at the brush C both an armature M. M. F. $M_2$ is produced (indicated by dash lines), the effect of which may be neutralized by a commutation winding arranged in a conventional manner about the commutation pole in front of C, and an armature M. M. F. $M_1$ (full lines), the direction of which is different on both sides of the brush C. The purpose of the present invention is to bring about, within the commutation zone for the brush C, a compensation M. M. F. M opposed to the last-mentioned armature M. M. F. $M_1$, which compensation M. M. F., therefore, has to be directed differently on both sides of C, i. e., if the said armature M. M. F. $M_1$ on one side of the symmetry plane of the commutation pole is positive and is negative on the other side thereof, the compensation M. M. F. M must have opposite polarities in these places. Since the M. M. F. M below the main poles has the same direction as the M. M. F. $M_K$ produced by the "normal" compensating winding I, the latter may partly replace the former, if no compensating winding I is employed, the commutation winding on the pole B may be made correspondingly weaker. The axial parts of each bundle of conductor within the compensating winding II according to the invention have to be located, of course, symmetrically for each commutation pole with respect to its plane of symmetry. It is evident that for each independent circuit one compensating winding for the invention is required.

I claim as my invention:

1. Compensating means for electric machines, comprising a plurality of circuits independent of each other, compensating windings embracing two main poles, and compensating windings placed in the commutation air gap and extended over two pole pitches so that the planes of symmetry of the axial coil sides of the said compensating windings coincide with the planes of symmetry of the commutation poles.

2. Compensating means for electric machines, comprising a plurality of circuits independent of each other, compensating windings embracing two main poles, and compensating windings placed within slots in the commutation poles and extended over two pole pitches so that the planes of symmetry of the axial coil sides of the said compensating windings coincide with the planes of symmetry of the commutation poles.

3. Compensating means for electric machines, comprising a plurality of circuits independent of each other, compensating windings embracing two main poles, and compensating windings placed in the commutation air gap and within slots in the commutation poles and extended over two pole pitches so that the planes of symmetry of the axial coil sides of the said compensating windings coincide with the planes of symmetry of the commutation poles.

References Cited in the file of this patent

FOREIGN PATENTS 886,938   Germany _____ Aug. 20, 1953